United States Patent
Pahud et al.

(10) Patent No.: US 8,542,237 B2
(45) Date of Patent: Sep. 24, 2013

(54) PARAMETRIC FONT ANIMATION

(75) Inventors: Michel Pahud, Kirkland, WA (US); William Buxton, Toronto (CA); Sharon Cunnington, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 12/143,839

(22) Filed: Jun. 23, 2008

(65) Prior Publication Data

US 2009/0315895 A1 Dec. 24, 2009

(51) Int. Cl.
*G06T 13/40* (2011.01)
*G06T 11/60* (2006.01)

(52) U.S. Cl.
USPC .......................... 345/473; 345/619; 345/685

(58) Field of Classification Search
USPC ................................ 345/473–475
See application file for complete search history.

(56) References Cited

U.S. PATENT DOCUMENTS

| | | | |
|---|---|---|---|
| 5,336,138 A * | 8/1994 | Arjawat ........................ | 482/10 |
| 7,089,504 B1 | 8/2006 | Froloff | |
| 2001/0049596 A1 | 12/2001 | Lavine et al. | |
| 2002/0194006 A1 | 12/2002 | Challapali | |
| 2003/0110450 A1 * | 6/2003 | Sakai ............................ | 715/529 |
| 2003/0154446 A1 | 8/2003 | Constant et al. | |
| 2003/0222874 A1 | 12/2003 | Kong et al. | |
| 2005/0116956 A1 * | 6/2005 | Beardow ...................... | 345/473 |
| 2006/0276234 A1 | 12/2006 | Kang et al. | |
| 2007/0013700 A1 | 1/2007 | Yoon et al. | |
| 2007/0226641 A1 | 9/2007 | Johnson et al. | |
| 2008/0280633 A1 * | 11/2008 | Agiv ............................ | 455/466 |

FOREIGN PATENT DOCUMENTS

| | | | |
|---|---|---|---|
| KR | 10-2003-0085212 A1 | 11/2003 | |
| WO | WO2007080559 A2 | 7/2007 | |

OTHER PUBLICATIONS

ARG! Dancing Cartoon Alphabet (http://www.artie.com/alpha-index.htm) updated on Oct. 30, 2007 Webpages on Dancing Alphabet frontpage; Webpages on Dancing Letter A, E, I, and N included.*
Preston Blair, "Cartoon Animation", 1994 (http://www.freetoon.com/prestonblair) Webpage on the book cover page, Chapter 1—Construction p. 10 and Chapter 3—Delayed Secondary Action p. 144 included.*
Preston Blair, "Cartoon Animation", 1994 (http://www.freetoon.com/prestonblair). Webpages on Chapter 3—"Alligator Ballet", and Chapter 4—"Dialogue Expressions—Pointers" are included.*
Email_Authorization_ExaminersAmendment dated May 10, 2013.*

(Continued)

*Primary Examiner* — Kee M Tung
*Assistant Examiner* — Sing-Wai Wu
(74) *Attorney, Agent, or Firm* — Lyon & Harr, LLP; Richard T. Lyon (57) ABSTRACT

Font animation technique embodiments are presented which animate alpha-numeric characters of a message or document. In one general embodiment this is accomplished by the sender transmitting parametric information and animation instructions pertaining to the display of characters found in the message or document to a recipient. The parametric information identifies where to split the characters and where to rotate the resulting sections. The sections of each character affected are then translated and/or rotated and/or scaled as dictated by the animation instructions to create an animation over time. Additionally, if a gap in a stroke of an animated character exists between the sections of the character, a connecting section is displayed to close the stroke gap making the character appears contiguous.

20 Claims, 8 Drawing Sheets

(56) References Cited

OTHER PUBLICATIONS

ProposedClaimAmendments_5-10-13_MCS67-07(322399 01) dated May 10, 2013.*

Lee, et al., "The Kinetic Typography Engine: An Extensible System for Animating Expressive Text", Symposium on User Interface Software and Technology, Proceedings of the 15th annual ACM symposium on User interface software and technology, Date: Oct. 27-30, 2002, pp. 81-90, vol. 4, Issue: 2, Publisher: ACM New York, NY; USA.

Lewis, et al., "ActiveText: A Method for Creating Dynamic and Interactive Texts", Symposium on User Interface Software and Technology, Proceedings of the 12th annual ACM symposium on User interface software and technology, Date: 1999, pp. 131-140, Publisher: ACM New York, NY, USA.

Möhler, et al., "A user interface framework for kinetic typography-enabled messaging applications", Date: Apr. 24-29, 2004, pp. 1505-1508, Publisher: ACM New York, NY, USA.

Strapparava, et al. "Dances with Words", IJCAI-07, pp. 1719-1724.

PCT application PCT/US2009/048344; International Search Report and Written Opinion; Jan. 26, 2010 mailing date.

* cited by examiner

PARAMETRIC FONT ANIMATION

BACKGROUND

The use of wireless, mobile communication devices, such as cellular telephones, and Personal Digital Assistants (PDAs), and the like, has fast become a dominant theme in today's society. People are continually finding new ways to use these mobile devices to communicate with each other. An interesting form of communication that has arisen is the use of the characters in a message to convey the emotions or feelings of the sender without relying on the meaning of the words.

One well known way of adding emotional content to a message is through the use of so-called emoticons. An emoticon is formed from a string of characters that together often look like a face and which are intended to represent the current emotions or feelings of the sender. For example, one common emoticon is the smiley face ":-)", which when viewed sideways appears to be a smiling face. This emoticon is obviously indicating the sender is happy about something.

SUMMARY

Font animation technique embodiments described herein animate alpha-numeric characters of a message or document displayed on a display screen. This can be done to convey the emotions of an author sending the message or document to a viewer of the animation. In one general embodiment the animation is accomplished by the sender of the message or document sending parametric information pertaining to alpha-numeric characters found in a message or document to a recipient. In one implementation, this parametric information includes, for each alpha-numeric character being animated, a position and orientation of a dividing line which transects the character so as to segment the character into first and second sections, and a location of a rotation point assigned to at least one character section. In addition, the sender transmits animation instructions pertaining to the display of alpha-numeric characters found in the message or document to the recipient. These animation instructions include, for each section of each character being animated, instructions for displaying the section for each of a series of prescribed-length time periods. More particularly, the instructions dictate if the section is to be displayed with a translation with respect to the other section, or a rotation about the rotation point of the section, or both, (or even no change as long as there was or will be some change in at least one of the sections during one of the time periods). In addition, the instructions can dictate that a section be scaled. However, it is noted that the instructions on how a section is to be displayed are not just limited to translations and/or rotation and/or scaling. Instructions dictating other changes are also possible.

The recipient receives the parametric information and animation instructions, and establishes a series of prescribed-length time periods as identified in the animation instructions for each character that is to be animated. The sections of each character affected are displayed during each time period as dictated in the animation instructions associated with that character. Additionally, in one implementation, if a gap in the stroke of an animated character exists between the sections of the character during a time period, a connecting section is displayed which connects an end of the character stroke in the first section with the corresponding end of the character stroke in the second section, such that the character appears contiguous across the stroke gap.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIGS. 3-5 depict how the letter "r" might be manipulated over two time periods as part of an animation of the character, where

FIGS. 6-8 depict how the letter "a" might be manipulated over two time periods as part of an animation of the character, where

FIGS. 9-11 depict how the letter "a" might be manipulated over two time periods as part of an animation of the character, where

DETAILED DESCRIPTION

In the following description of emotional font animation technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Emotional Font Animation

The emotional font animation technique embodiments described herein are intended to evoke a response in a person viewing a message (such as short messaging service (SMS), multi-media messaging service (MMS), enhanced messaging service (EMS), instant messaging (IM), email, and so on) or presentations and document (such as web pages, slideshow presentations, text, and so on) that convey the emotions of the author. More particularly, the embodiments described herein allow an author to convey emotion and mood through the animation of the alpha-numeric characters of the characters, words, sentences, paragraphs, etc. in a message or document. It is noted that the term alpha-numeric characters is defined to mean letters, numbers and any special characters.

Adding emotional content to a message or document through the animation of its characters has many advantages. It adds interest and helps to capture and hold a reader's attention. It could also be used as a teaching tool. Adding emotional content in the foregoing way also allows the author to add information not contained in the words alone. For example, animating the characters can add emphasis to certain portions or assist the reader in understanding the intended meaning of the words, sentences, paragraphs, and so on, in the message or document. The conveyed meaning can be subtle, even subliminal, or quite blatant depending on the animation.

For example, the text of an entire message or document or any part thereof can be animated to convey joy by making the alpha-numeric characters involved appear to dance. Sadness can be conveyed by making the characters appear to slowly droop. It could also represent feelings like cold that could be conveyed by shaking the parts of the character. Hot that could be conveyed by showing the characters melting down. Sleepy that could be conveyed by showing the characters stretching and fall asleep. These are just a few examples; many more emotions can also be expressed in the animations.

Figure 1:
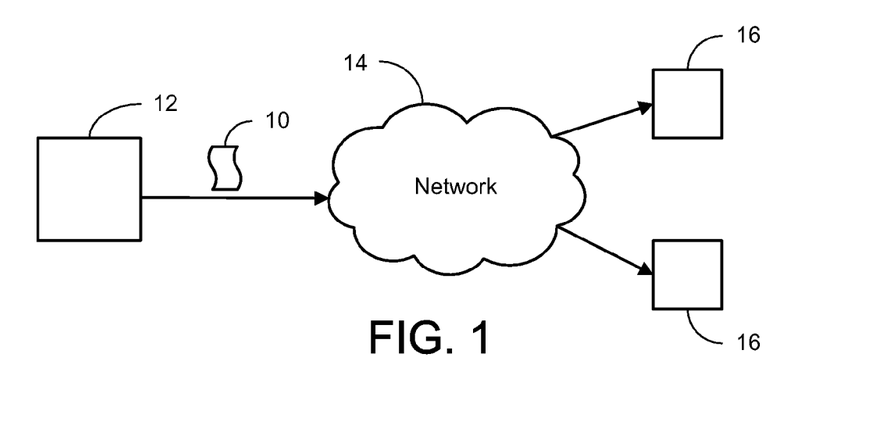
FIG. 1 is a simplified architectural diagram of a computer network where an animated message or document is transmitted to one or more recipients (two are shown).

In general, the emotional font animation technique embodiments described herein can be implemented via a communication transmitted over a computer network (such as the Internet or an intranet) from a sender to a recipient. A simplified view of this network environment is illustrated in FIG. 1, where an animated message or document 10 is generated by a sender and transmitted via the sender's computing device 12 over a network 14 to the computing devices 16 of one or more recipients (two are shown). As will be described later in this description, the sender's and recipient's computing devices can take many forms, which include, but are not limited to cell phones, PDAs, and the like.

The sections to follow will describe the animating aspects of the emotional font animation technique embodiments first and then the transfer and display of an animated message or document. It is noted that in some embodiments the information and instructions needed to animate a message or document can be provided ahead of time to recipients. In such a case, the sender simply designates what animation is to be used and the information and instructions are already resident with the recipient. In other embodiments the information and instructions needed for animation are provided with the message or document itself. In either case, the sender can customize the type of animation presented to a recipient on a recipient-by-recipient basis. Thus, the same message or document may be animated differently depending on the recipient. It is also noted that in some embodiments the type of animation presented to a recipient is designated before the message or document is authored. In such a case the type of animation associated with a recipient could be automatically implemented based on these prior designations. In other embodiments, the sender can specify the type of animation during the authoring of the message itself. Thus, the sender would not be tied to a pre-defined type of animation for a particular recipient.

2.0 Parametric Representation and Animation of Alpha-Numeric Characters

The emotional font animation technique embodiments described herein can be implemented using a parametric representation of the alpha-numeric characters in a message or document that supports a rich range of animation styles, while still being able to be rendered by a light-weight processor such as those found in mobile devices (e.g., cellular telephones, PDAs, and the like). In addition, the representation should works across any font type.

Figure 2A:
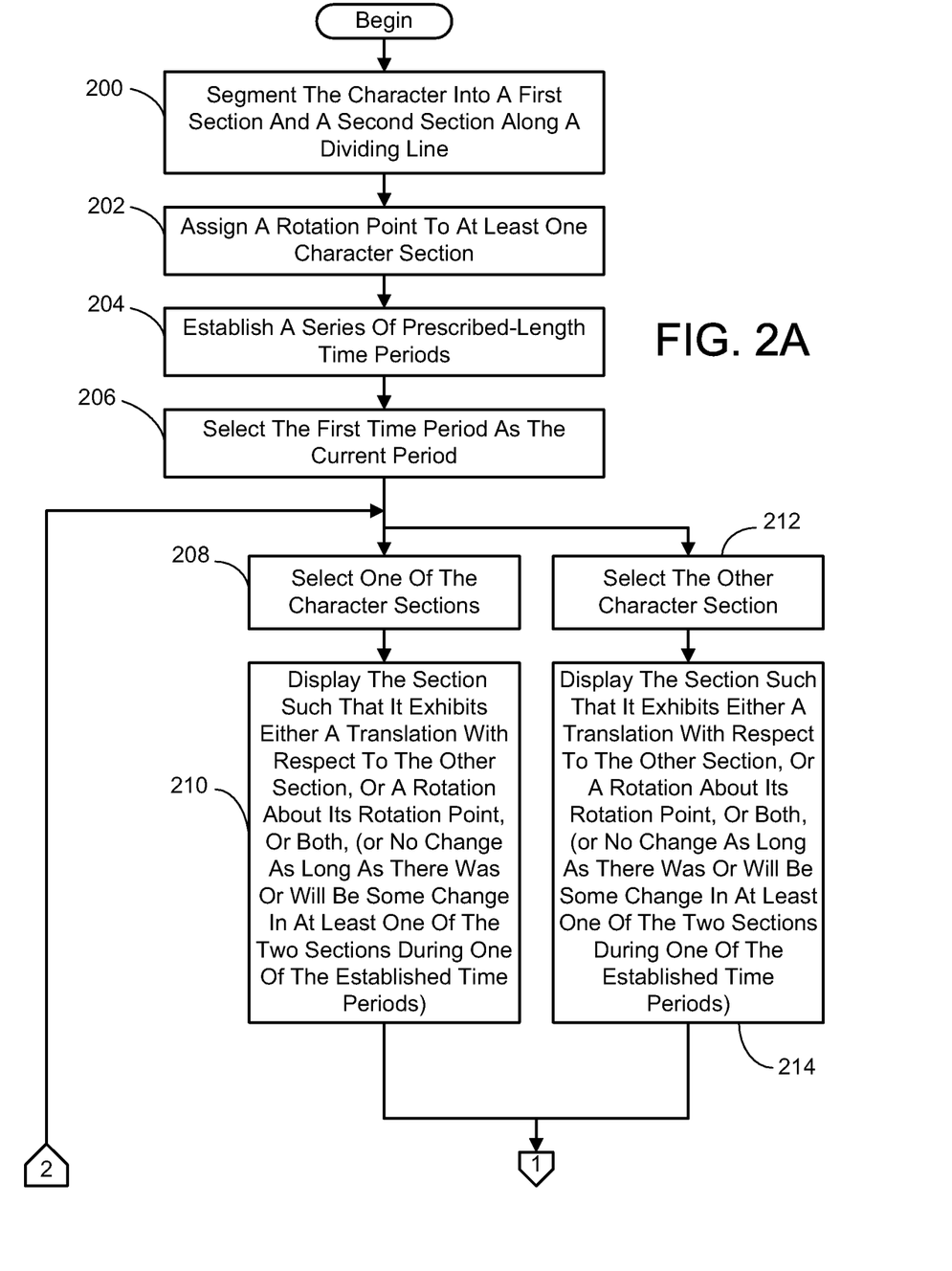
FIGS. 2A-B depict a continuing flow diagram generally outlining one embodiment of a process for animating alpha-numeric characters of a message or document.
Figure 2B:
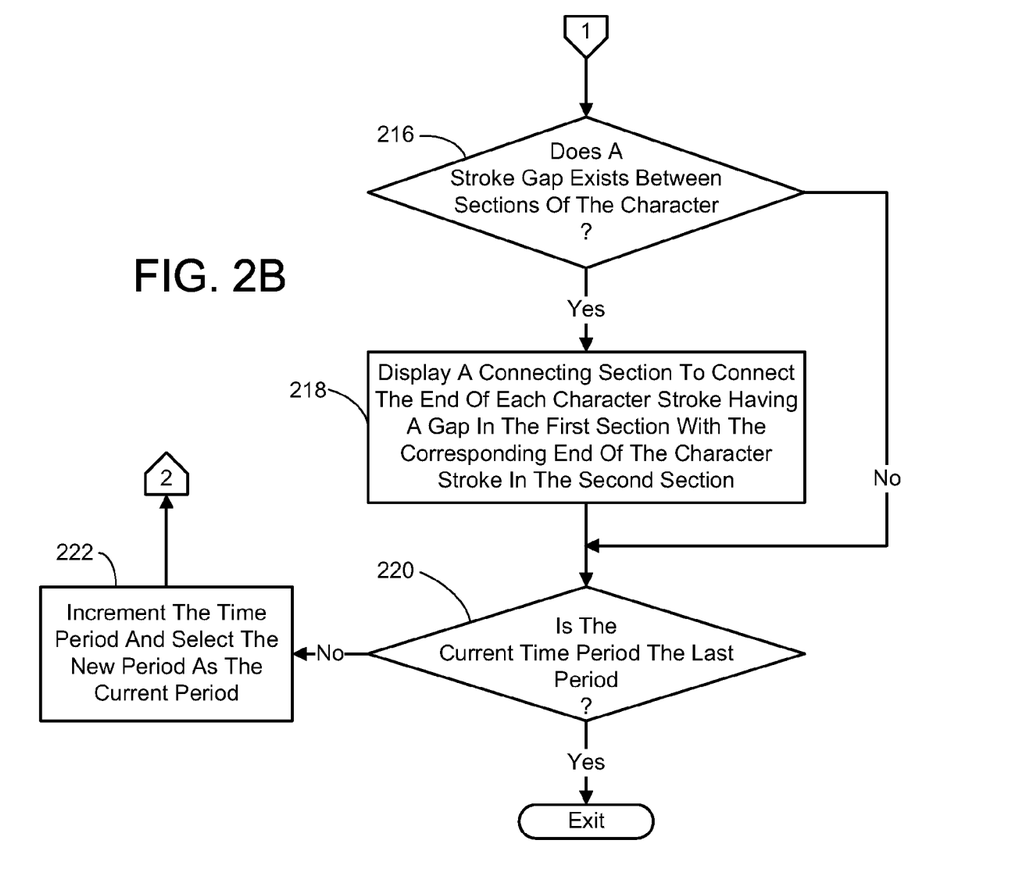

In one version, each alpha-numeric character in a message or document that is to be animated is parametrically represented and animated as shown in FIGS. 2A-B. First, the character is segmented into a first section and a second section, along a dividing line (200). A rotation point is then assigned to at least one of these character sections (202). This creates the aforementioned parametric representation of the character. The animation of the character is then accomplished by establishing a series of prescribed-length time periods (204) and selecting the first time period as the current period (206). It is noted that the prescribed length of each time period can be the same as all other periods or vary from one period to the other. One of the character sections is then selected (208), and the section is displayed to a viewer such that in comparison with its appearance in the immediately preceding time period (if there was one) it exhibits either a translation with respect to the other section, or a rotation about the rotation point of the selected section, or both, or no change as long as there was or will be some change in at least one of the two sections during one of the established time periods (210). Additionally, the other character section is selected (212), and this section is displayed to a viewer such that in comparison with its appearance in the immediately preceding time period (if there was one) it exhibits either a translation with respect to the other section, or a rotation about its rotation point, or both, or no change as long as there was or will be some change in at least one of the two sections during one of the established time periods (214). It is next determined if a stroke gap exists between the sections of the character (216). If so, a connecting section is displayed which connects the end of the character stroke in the first section with the corresponding end of the character stroke in the second section for each stroke having a gap (218). In this way, the character appears contiguous across the stroke gap. It is noted that a stroke gap is defined as a gap between parts of a stroke associated with a character that is formed when the first and second sections of a character become separated during an animation time period. In other words, if a stroke making up part of a character extends across the aforementioned transecting dividing line and is separated into two parts (one part in the first section and one part in the second section) as a result of the animations of the sections during an animation time period, then a stoke gap has formed. Thus, for example, a stroke gap is not formed if a small letter "i" is transected between the vertical line and the overlying dot. While a gap exists, it is not a stroke gap. A similar non-stroke gap condition also occurs if a colon ":" or semi colon ";" is transected between their upper and lower strokes. Generally, any time a gap exists in a transected character which has not resulted from a stroke of the character being transected, it is not considered a stroke gap, and so a connecting section is not used to close the gap.

The animation continues in the foregoing manner until the last time period of the animation. To this end, once the connecting section or sections are displayed, or if there was no stroke gap, it is determined if the current time period is the last time period (220). If it is the last time period, then the process ends. However, if it is not the last time period of the animation, the time period is incremented, and the new period is selected as the current period (222). Actions 208 through 222 are then repeated as appropriate for the current time period.

In generally, the aforementioned dividing line can have any height and orientation desired. As an example, the height of the dividing line can be measured from the bottom of the character being transected up to a location defined by the center of the line. Alternately its height can be defined as the distance between the bottom of the character and the lowest point on the line (assuming the line is not vertical). Also as an example, the line can have an orientation defined as an angle of rotation about a point along its length ranging from 0 degrees to 180 degrees. Thus, the line could be oriented horizontally, vertically, or at any angle in between. In one implementation of the foregoing parametric representation, each of the alpha-numeric character is segmented using a horizontal line having a prescribed height above the bottom of the character. The resulting sections can be rotated independently about a rotation point that is located anywhere outside or inside the associated section. However, in tested embodiments, the rotation point was located on the dividing line. More particularly, if the character is such that the dividing line transects it only once, the rotation point is assigned to a location that lies along the dividing line within the transected portion of the character. For example, the rotation point can be located at center of the stroke of the character. If the character is such that the dividing line transects it twice, the rotation point can be assigned to a location that lies along the dividing line between the two transected portions of the character. For example, the rotation point can be located equidistant from each transected character portion. If the character is such that the dividing line transects it three times, the rotation point can be assigned to a location that lies along the dividing line within the transected portion of the character that is between the other two transected portions of the character. For example, the rotation point can be located at center of the middle stroke of the character.

In regard to the animation, in one implementation of the foregoing, each section can be translated with respect to the other section in any desired direction. However, in tested embodiments a vertical translation of a prescribed distance was employed. Additionally, if a section is rotated, it would be rotated about the rotation point of the section to a prescribed degree in either the clockwise or counterclockwise direction. It is noted that these simple transformations applied to the character sections facilitates their execution in even a rudimentary processor found in many mobile devices.

In regard to the aforementioned connecting sections, in one implementation of the foregoing, four points for each stroke of a character intersecting the dividing line (i.e., two for each section), are located. To draw the connecting sections of a character stroke, the position of the points after the sections are translated, scaled and/or rotated are calculated and the appropriate points in each section are connected and the resulting shape filled.

Figure 3:
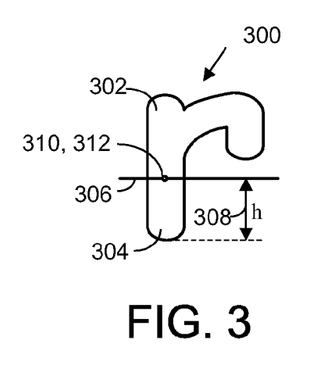
FIG. 3 shows the character in its initial state.
Figure 4:
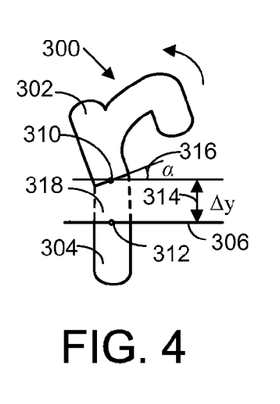
FIG. 4 shows the character as it could appear in a first time period.
Figure 5:
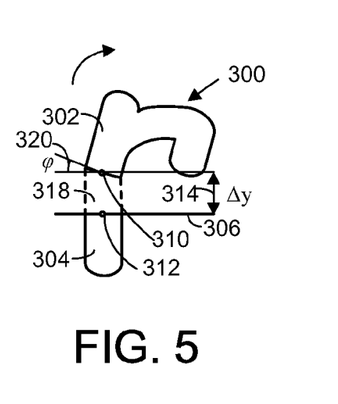
FIG. 5 shows the character as it could appear in a second time period.

FIGS. 3-5 exemplify how the letter "r" 300 can be manipulated over two time periods as part of an animation of the character. In FIG. 3, the letter is segmented into upper section 302 and lower section 304 by the horizontal dividing line 306, which transects the character at a height h 308 up from the bottom of the character. Also note the rotation points 310, 312 that lie on the dividing line 306 in the center of the vertical stroke of the character. In FIG. 4, the upper section 302 of the character has been translated vertically away from the lower section 304 by a distance $\Delta y$ 314. It is noted that the lower section could have been translated vertically downward away from the upper section for a similar effect. If fact, as each section of each character is operated on independently, the upper section can be translated upward, while at the same time the lower section is translated downward. In addition, horizontal translation is also possible where the upper section of the character is translated horizontally away from the lower section by a distance $\Delta x$. In addition, the upper section 302 has been rotated about its rotation point 310 in the counterclockwise direction by amount equal to angle $\alpha$ 316. Also notice that the stroke gap between the two sections of the character has been joined with a connecting section 318. FIG. 5 depicts the changes that could be made to the character in the next time period to continue the animation. Here, the upper section 302 of the character remains translated vertically away from the lower section 304 by the distance $\Delta y$ 314. However, the upper section 302 has been rotated about its rotation point 310 in the clockwise direction from its position in FIG. 4 to a position that forms an angle $\phi$ 320 with the horizontal axis. Here again, the stroke gap between the two sections of the character has been joined with a connecting section 318.

Figure 6:
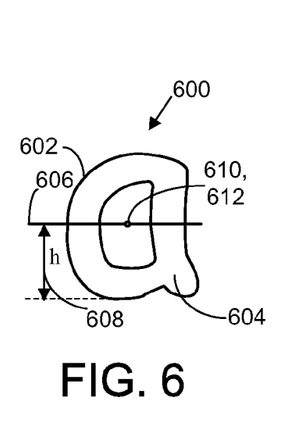
FIG. 6 shows the character in its initial state.
Figure 7:
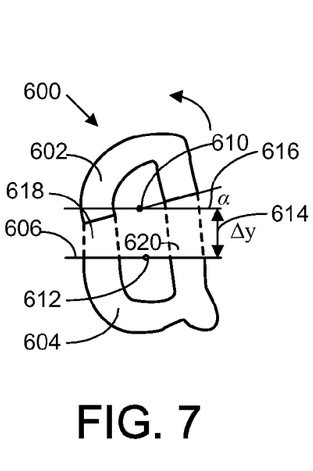
FIG. 7 shows the character as it could appear in a first time period.
Figure 8:
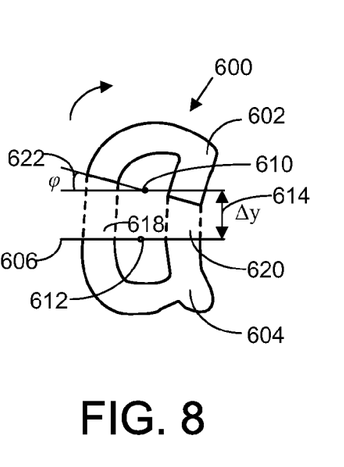
FIG. 8 shows the character as it could appear in a second time period.

FIGS. 6-8 exemplify how a character having two transected portions can be manipulated over two time periods as part of an animation of the character. In this case the letter "a" 600 is used as the example character. In FIG. 6, the letter is segmented into upper section 602 and lower section 604 by the horizontal dividing line 606, which transects the character at a height h 608 up from the bottom. The rotation points 610, 612 lie on the dividing line 606 between the two transected portions of the character. In FIG. 7, the upper section 602 of the character has been translated vertically away from the lower section 604 by a distance $\Delta y$ 614. In addition, the upper section 602 has been rotated about its rotation point 610 in the counterclockwise direction by amount equal to angle $\alpha$ 616. Note that the stroke gap between the two sections 602, 604 of the character has been joined with connecting sections 618, 620. FIG. 8 depicts the changes that could be made to the character in the next time period to continue the animation. Here, the upper section 602 of the character remains vertically translated away from the lower section 604 by the distance $\Delta y$ 614. However, the upper section 602 has been rotated about its rotation point 610 in the clockwise direction from its position in FIG. 7 to a position that forms an angle $\phi$ 622 with the horizontal axis. Once again, the stroke gaps between the transected portions of the two sections have been joined with connecting sections 618, 620.

Figure 9:
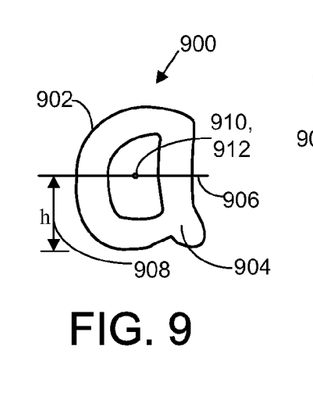
FIG. 9 shows the character in its initial state.
Figure 10:
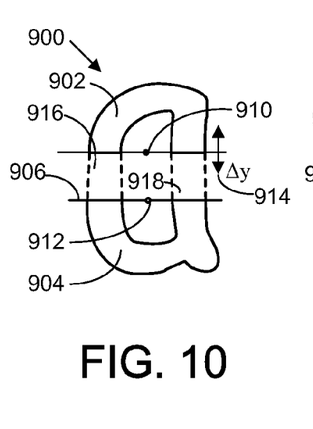
FIG. 10 shows the character as it could appear in a first time period.
Figure 11:
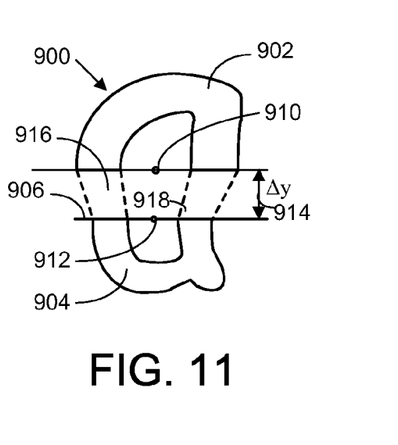
FIG. 11 shows the character as it could appear in a second time period with the upper section being scaled up in size.

In addition to the above-described translation and rotation, one implementation the animation can also include displaying a section so as to exhibit a scaling in size to a prescribed degree. This scaling can result in an increase or decrease in the size of the character section. It is noted that the scaling can be uniform in the x and y directions, or each direction can be scaled a different amount. FIGS. 9-11 exemplify how a character can be manipulated over two time periods as part of an animation of the character that includes scaling—which in this example is an increase in size of the upper section of the letter "a" 900. In FIG. 9, the letter 900 is segmented into upper section 902 and lower section 904 by the horizontal dividing line 906, which transects the character at a height h 908 up from the bottom. The rotation points 910, 912 lie on the dividing line 906 between the two transected portions of the character. In FIG. 10, the upper section 902 of the character has been translated vertically away from the lower section 904 by a distance $\Delta y$ 914. Note that the stroke gap between the two sections 902, 904 of the character has been joined with connecting sections 916, 918. FIG. 11 depicts the changes that could be made to the character in the next time period to continue the animation. Here, the upper section 902 of the character remains vertically translated away from the lower section 904 by the distance $\Delta y$ 914. However, the upper section 902 has been scaled up in size by a prescribed scaling factor. Once again, the stroke gaps between the transected portions of the two sections have been joined with connecting sections 916, 918.

Given the foregoing, it can be seen that it is possible to animate all or any subset of the alpha-numeric characters in a message or document. The characters selected for animation are divided in two sections that can be translated, rotated, and/or scaled independently. A join is then generated on-the-fly to connect the upper and lower sections of the animated characters together as needed. This mix of manipulations supports a broad range of possible animations, which can be tailored to express the emotions of a sender.

It is noted that the connecting sections are depicted in FIGS. 4, 5, 7, 8, 10 and 11 using dashed lines, to facilitate the foregoing description. In an actual implementation the connecting sections would typically be solid and filled with the same color as rest of the character. However, as will be described later, the color of the sections might be varied, and as such the connecting sections could be colored to match either section, or to exhibit their own colors that are different from the other sections.

3.0 Transfer of the Parametric Information and Animation Instructions

Figure 12:
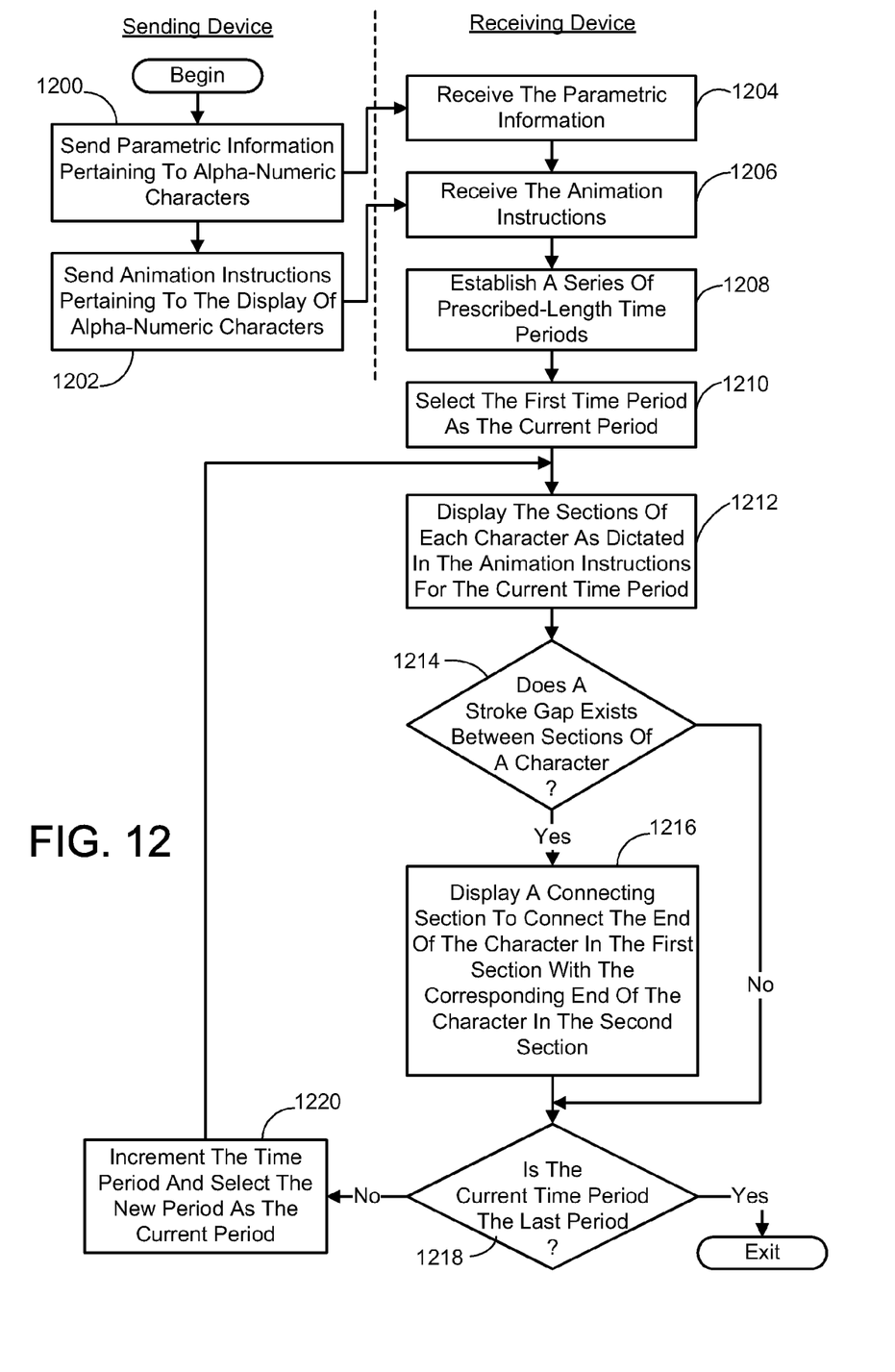
FIG. 12 depicts a flow diagram generally outlining an embodiment of the transfer and use of parametric information and animation instructions.

In one general embodiment the transfer and use of the parametric information and animation instructions is accomplished as follows. Referring to FIG. 12, a sending computing device transmits, via the computer network, the previously-described parametric information pertaining to alpha-numeric characters found in a message or document to a recipient computing device (1200). In addition, the sending device transmits, via the computer network, the previously-described animation instructions pertaining to the display of alpha-numeric characters found in the message or document to the recipient device (1202). The recipient device receives the parametric information (1204) and animation instructions (1206). The recipient computing device then establishes a series of prescribed-length time periods as identified in the animation instructions (1208) and selects the first time period as the current period (1210). The recipient device then displays the sections of each character as dictated in the animation instructions associated with that character for the current time period of the animation (1212). In addition, it is determined by the recipient device if a stroke gap exists between sections of a character (1214). If so, a connecting section is displayed which connects the end of the character in the first section with the corresponding end of the character in the second section, such that the character appears contiguous across the stroke gap (1216).

Once the connecting section or sections are displayed, or if there was no stroke gap, it is determined if the current time period is the last time period (1218). If it is the last time period, then the process ends. However, if it is not the last time period of the animation, the time period is incremented, and the new period is selected as the current period (1220). Actions 1212 through 1220 are then repeated for the current time period, as appropriate.

In one implementation, the previously-described parametric information and animation instructions are pre-installed on the recipient's device. In another implementation, the parametric information and animation instructions are sent with the message or document to the recipient. In yet another implementation, the information and instructions are sent in advanced to the recipient or recipients, and used to animate the message or document when it is received. THE latter two of these implementations will now be described in more detail.

3.1 Transferring with the Message or Document

In the implementation where the parametric information and animation instructions are sent with the message or document, these items can take the form of metadata for each alpha-numeric character that is to be animated. This metadata identifies the height and orientation of the dividing line and the location of the rotation points, and includes a script specifying the previously-described manipulations that are to be applied to each character section during each time period for the duration of the animation.

Figure 13:
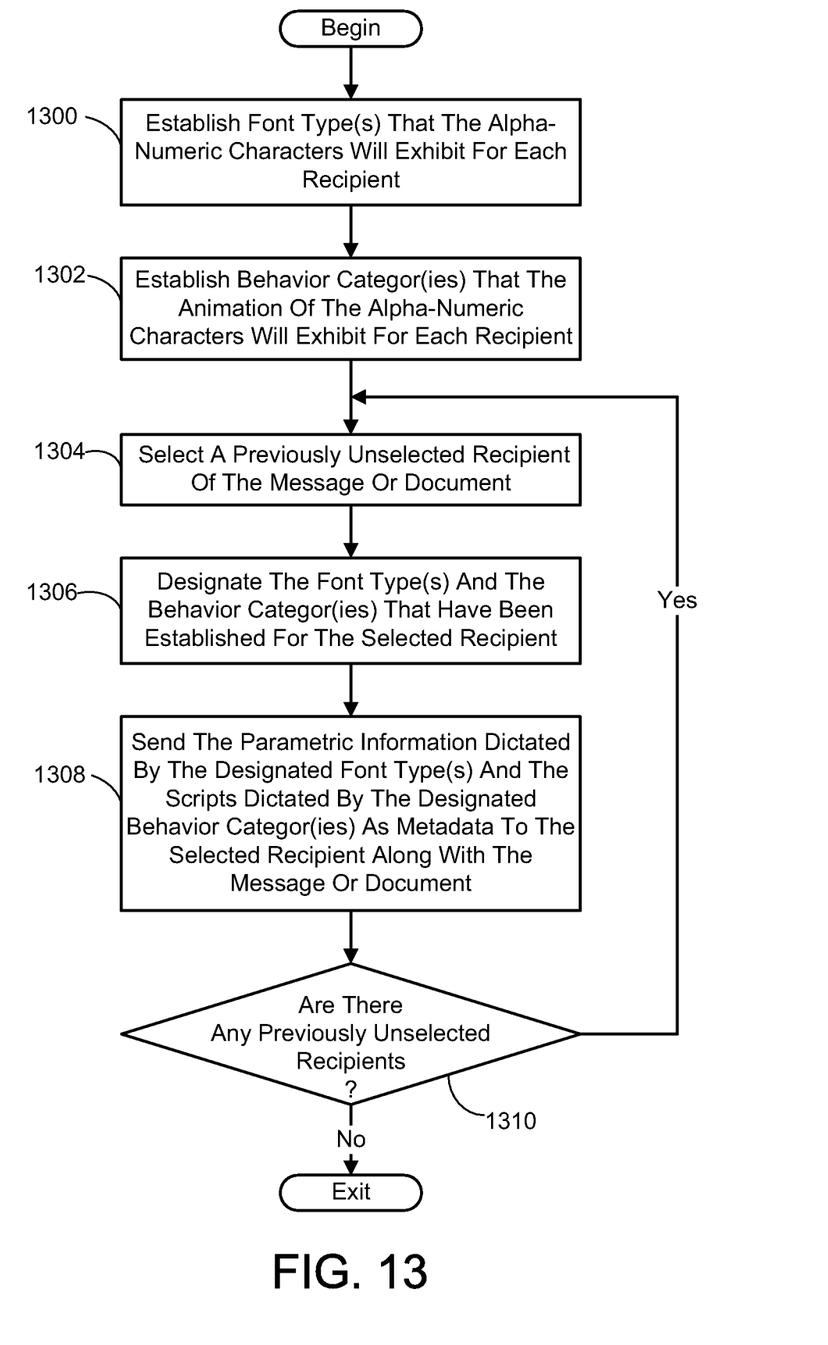
FIG. 13 depicts a flow diagram outlining an implementation of the process of FIG. 12, where the parametric information and animation instructions are tailored for each recipient and sent with the message or document in the form of metadata for each alpha-numeric character that is to be animated.

Since parametric information and animation instructions are provided for each character in the message or document that is to be animated, the metadata can be tailored to the specific character it is associated with. For example, referring to FIG. 13, the generation of this per-character metadata can be accomplished by first establishing a font type or types that the alpha-numeric characters will exhibit in the message or document (1300), as well as a behavior category or categories that the animation of the alpha-numeric characters will exhibit (1302), for each recipient that is to receive the message or document. The recipients are specified by the sender—for example as part of generating the message or document. The font type dictates what parametric information is to be sent as this information is pre-tailored to the font type. The behavior category dictates what instructions are included in the script for each character. The font-specific parametric information in conjunction with the behavior-specific script is designed to produce an animation that conveys the emotions of a message sender. It is noted that different font types and behavior categories can be assigned to different recipients, so that the same message or document can be animated in different ways for the various recipients. To this end, a previously unselected recipient of a message or document being sent is selected (1304). This is followed by designating the font type or types and the behavior category or categories that have been established for the selected recipient (1306). The parametric information dictated by the designated font type or types of the alpha-numeric characters found in the message or document and the scripts dictated by the designated behavior category or categories are then sent as metadata to the selected recipient along with the message or document characters (1308). The latter part of this process is then repeated for each additional recipient of the message or document. To this end, it is determined if there are any previously unselected recipients (1310). If so, actions 1304 through 1310 are repeated. When all the recipients of the message or document being sent have been considered, the process ends.

In the foregoing procedure, an alpha-numeric character's font type and behavior category can be accomplished as a separate task from the generation of the message or document. Thus, a sender can customize the character animations for a recipient in advance of sending the message or document. However, in one embodiment, this is done as part of generating the message. More particularly, the font type and behavior category associated with a character (or group of characters—e.g. word, sentence, paragraph, entire message or document) is identified from certain triggering characters entered into the message or document by the author. For example, these triggering characters could be emoticons, or they could be a pre-defined word, phrase, punctuation mark, or the like. This allows a sender to customize the character animations as the message or document is being composed.

Figure 14:
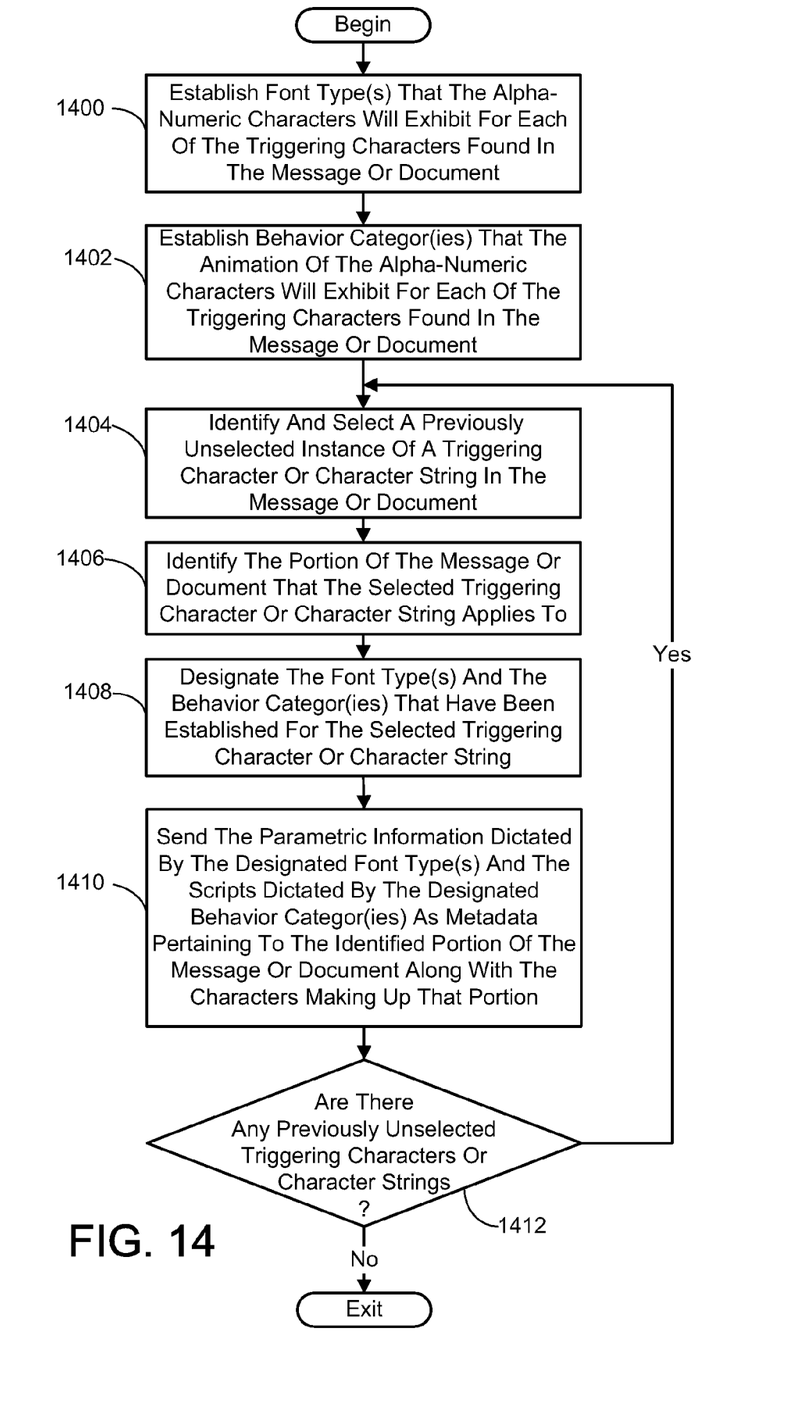
FIG. 14 depicts a flow diagram outlining an implementation of the process of FIG. 12, where the parametric information and animation instructions are keyed to triggering characters found in the message or document and sent with the message or document in the form of metadata for each alpha-numeric character that is to be animated.

Referring to FIG. 14, in this latter embodiment, the generation of per-character metadata based on triggering characters found in the message or document can be accomplished by first establishing a font type or types that the alpha-numeric characters will exhibit in the message or document (1400), as well as a behavior category or categories that the animation of the alpha-numeric characters will exhibit (1402), for each of the triggering characters found in a message or document. As with previous embodiments, the font-specific parametric information in conjunction with the behavior-specific script is designed to produce an animation that conveys the emotions of a message sender. A previously unselected instance of a triggering character (if a single character is in itself the trigger) or character string (if a series of characters represent the trigger—such as with a triggering word or phrase) in the message or document being sent is then identified and selected (1404), and the portion of the message or document the selected triggering character or character string applies to is also identified (1406). This is followed by designating the font type or types and the behavior category or categories that have been established for the selected triggering character or character string (1408). The parametric information dictated by the designated font type or types and the scripts dictated by the designated behavior category or categories are then sent as metadata pertaining to the identified portion of the message or document along with the alpha-numeric characters making up that portion (1410). The latter part of this process is then repeated for each additional instance of a triggering character or character string in the message or document. To this end, it is determined if there are any previously unselected triggering characters or character strings (1412). If so, actions 1404 through 1412 are repeated. When all the triggering characters or character strings have been considered, the process ends.

3.2 Transferring Prior to Sending the Message or Document

In the implementation where the parametric information and animation instructions are sent to recipients of messages or documents ahead of time, these items can take the form of a parametric information file (which will be referred to a split file) and an animation instruction file (which will be referred to as a script file). The split file provides the height and orientation of the dividing line, or the location of the rotation points, or both, for each alpha-numeric character associated with at least each font type that it is desired to use in messages or documents coming from a sender to that recipient. The script file provides scripts specifying the previously-described manipulations that are to be applied to the sections of each type of alpha-numeric character it is desired to animate during each time period of the animation for each behavior category. Thus, the script file includes a separate script for each character in each behavior category. It is noted that in one implementation the scripts are not font specific, meaning the same script applies to a character across all the desired font types. However, this need not always be the case. It is also possible to tailor the scripts to a specific font type or specific group of font types, if desired.

In this implementation, the sender's computing device need only send the desired font type and behavior category designations for each character in the message that is to be animated, rather than the parametric information and animation instructions themselves as this information will already be resident on the recipients computing device in the form of split and script files. These designations can be established in advanced for a recipient and automatically sent with the message, or can be specified by the sender for each recipient when composing the message or document.

Figure 15:
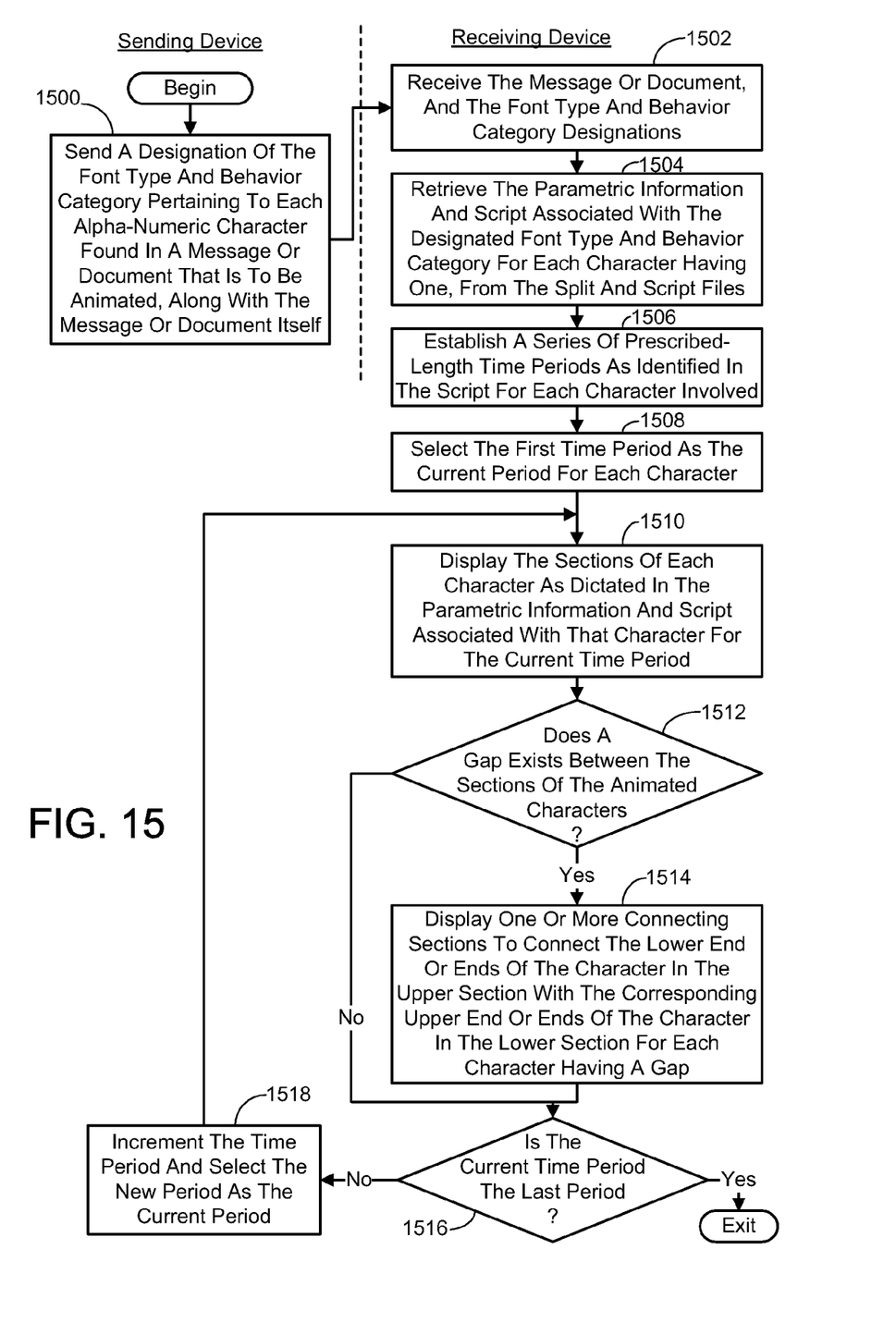
FIG. 15 depicts a flow diagram generally outlining an embodiment of the transfer and use of parametric information and animation instructions, where this data is sent to recipients ahead of time in the form of split and script files, and only designations of the desired font type and behavior category for each character that is to be animated are sent with the message or document.

Thus, for example, referring to FIG. 15, a sending computing device transmits, via the computer network, a designation of the font type and behavior category pertaining to each alpha-numeric character found in a message or document that is to be animated, to a recipient computing device, along with the message or document itself (1500). The recipient device receives message or document, and the font type and behavior category designations (1502). It is noted that the font type can be contained within the message itself. The recipient computing device then retrieves the parametric information and script associated with the designated font type and behavior category for each character in the message or document that has one and that is to be animated, from the split and script files (1504). A series of prescribed-length time periods are then established as identified in the script for each character involved (1506). The first time period is selected as the current period for each character involved (1508). The recipient device then displays the sections of each character being animated as dictated in the parametric information and script associated with that character for the current time period (1510). In addition, it is determined by the recipient device if a stroke gap exists between the upper and lower sections of the animated characters (1512). If so, for each character having a stroke gap, one or more connecting sections are displayed which connects the lower end or ends of the character in the upper section with the corresponding upper end or ends of the character in the lower section, such that the character appears contiguous across the stroke gap (1514).

Once the connecting section or sections are displayed, or if there was no stroke gap, it is determined if the current time period is the last time period (1516). If it is the last time period, then the process ends. However, if it is not the last time period of the animation, the time period is incremented, and the new period is selected as the current period (1518). Actions 1510 through 1518 are then repeated for the current time period, as appropriate.

4.0 Additional Emotion-Conveying Attributes

In addition to animating some or all of the alpha-numeric characters in a message or document, other emotion-conveying attributes can be incorporated as well. For example, in one implementation, the audio instructions can be provided along with the animation instructions (either with the message or document, or in a pre-positioned audio script file). The audio instructions dictate the playing audio sound effects during one or more of the prescribed-length time periods for the animation. In another implementation, texture instructions can be provided along with the animation instructions (again either with the message or document, or in a pre-positioned texture script file). The texture instructions dictate the color and/or the appearance (e.g., wide, narrow, tall, short, soft and cushiony, sharp and spiky, and so on) of each character in the message or program that it is desired to affect during one or more of the prescribed-length time periods of the animation. In the case of color, for example, the color could change from a pale shade to an intense shade over the course of the animation to convey a sense of increased emotion.

5.0 The Computing Environment

A brief, general description of a suitable computing environment in which portions of the emotional font animation technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 16:
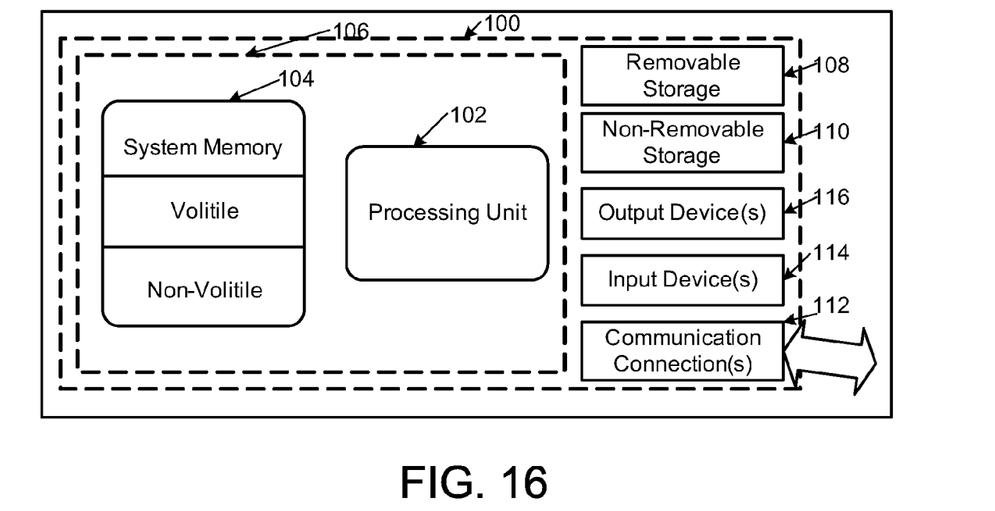
FIG. 16 is a diagram depicting a general purpose computing device constituting an exemplary system for implementing emotional font animation technique embodiments described herein.

FIG. 16 illustrates an example of a suitable computing system environment. The computing system environment is only one example of a suitable computing environment and is not intended to suggest any limitation as to the scope of use or functionality of emotional font animation technique embodiments described herein. Neither should the computing environment be interpreted as having any dependency or requirement relating to any one or combination of components illustrated in the exemplary operating environment. With reference to FIG. 16, an exemplary system for implementing the embodiments described herein includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 16 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 16 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The emotional font animation technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

6.0 Other Embodiments

In the foregoing description of the emotional font animation technique embodiments the alphanumeric characters were divided into two sections—namely and upper section and lower section assuming the dividing line is horizontal. However, more generally, given that the dividing line can have a range of orientations as described previously, the characters can be said to be divided into a first and second section, which would be operated upon as described above in regard to the upper and lower sections. Further, while the foregoing description was limited to just one dividing line and two sections, this need not be the case. Multiple dividing lines could be employed, resulting in more than two sections. Regardless, each section would be operated upon as described above for either the upper and lower sections. Still further, while the aforementioned connecting sections were described as have straight sides, this need not be the case. Rather the sides of the connecting sections can be curved as desired. In addition, the aforementioned dividing line need not be a straight line—it can be curved as well.

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for animating alphanumeric characters, comprising using a computer to perform the following process actions for each of at least one character:

segmenting the character into a first section and a second section, along a straight, geometric dividing line which transects the character transversely and which has a prescribed position defined by a distance between a first prescribed point on the dividing line and a prescribed horizontal line associated with the character and orientation defined by an angle of rotation about a second prescribed point, said first prescribed point and second prescribed point being at the same location or different locations;

assigning a rotation point to at least one character section;

for each character section, during each of a series of prescribed-length time periods, displaying the section so as to exhibit in comparison with its appearance in the immediately preceding time period, a translation with respect to the other section, or a rotation about the rotation point of the section, or both, or no change as long as there was or will be some change in at least one of the sections during one of the time periods; and whenever a gap exists in a stroke of the character between the first and second sections during a time period, displaying a connecting section for each stroke gap which connects an end of the character stroke in the first section with a corresponding end of the character stroke in the second section, such that the character appears contiguous across the stroke gap.

2. The process of claim 1, wherein the process action of segmenting the character into the first section and second sections, along a straight dividing line which transects the character transversely and which has a prescribed position and orientation, comprises an action of segmenting the character along a horizontal line having a prescribed height from the bottom of the character.

3. The process of claim 1, wherein the process action of assigning a rotation point to at least one character section, comprises an action of assigning the rotation point for a section to a location that lies on the dividing line.

4. The process of claim 3, wherein the dividing line transects only one stroke of the character, and wherein the process action of assigning the rotation point for a section to a location that lies on the dividing line, comprises an action of assigning the rotation point for a section to a location that lies along the dividing line within the transected stroke of the character.

5. The process of claim 3, wherein the dividing line transects two strokes of the character, and wherein the process action of assigning the rotation point for a section to a location that lies on the dividing line, comprises an action of assigning the rotation point for a section to a location that lies along the dividing line between the two transected strokes of the character.

6. The process of claim 3, wherein the dividing line transects three strokes of the character, and wherein the process action of assigning the rotation point for a section to a location that lies on the dividing line, comprises an action of assigning the rotation point for a section to a location that lies along the dividing line within the transected stroke of the character that is between the other two transected strokes of the character.

7. The process of claim 1, wherein the process action of displaying the section so as to exhibit in comparison with its appearance in the immediately preceding time period, a translation with respect to the other section, comprises displaying the section with a vertical translation of a prescribed distance.

8. The process of claim 1, wherein the process action of displaying a section, further comprises scaling the size of the section to a prescribed degree resulting in an increase or decrease in the size of the character section.

9. The process of claim 1, wherein the process action of displaying the section so as to exhibit in comparison with its appearance in the immediately preceding time period, a rotation about the rotation point of the section, comprises displaying the section with a prescribed amount of rotation in a prescribed clockwise or counterclockwise direction.

10. A computer-implemented process for animating alpha-numeric characters in a message or document displayed on a display screen, comprising using a computer to perform the following process actions for each of at least one character:

receiving parametric information pertaining to alpha-numeric characters found in the message or document comprising, for each character, a position and orientation of a straight, geometric dividing line which transects the character transversely so as to segment the character into a first section and a second section, wherein said dividing line position is defined by a distance between a first prescribed point on the dividing line and a prescribed horizontal line associated with the character and said dividing line orientation is defined by an angle of rotation about a second prescribed point, said first prescribed point and second prescribed point being at the same location or different locations, and a location of a rotation point assigned to at least one character section;

receiving animation instructions pertaining to the display of alpha-numeric characters found in the message or document on said display screen, comprising for each section of each character that is to be animated, instructions for displaying the section for each of a series of prescribed-length time periods, said instructions defining if the section is to be displayed, in comparison with its appearance in the immediately preceding time period, with a translation with respect to the other section, or a rotation about the rotation point of the section, or both, or no change as long as there was or will be some change in at least one of the sections during one of the time periods; and for each time period, displaying the sections of each character as dictated in the instructions associated with that character, and whenever a stroke gap exists between the first and second sections of the character during a time period, displaying a connecting section for each stroke gap which connects an end of the character stroke in the first section with a corresponding end of the character stroke in the second section, such that the character appears contiguous across the stroke gap.

11. The process of claim 10, wherein the process action of receiving parametric information pertaining to alpha-numeric characters found in the message or document, comprises an action of receiving a split file prior to receiving the message or document, wherein said split file identifies the position and orientation of the dividing line, or the location of the rotation point assigned to a character section, or both, for each alpha-numeric character in each of a plurality of font types, and wherein the plurality of font type includes a font type associated with the characters found in said message or document.

12. The process of claim 11, wherein the process action of receiving animation instructions pertaining to the display of alpha-numeric characters found in the message or document, comprises an action of receiving a script file prior to receiving the message or document, wherein said script file provides instructions for displaying the sections of each alpha-numeric character of any font type for each of said series of prescribed-length time periods, and for each of one or more of behavior categories.

13. The process of claim 12, wherein said message or document comprises a designation of the font type and the behavior category for each character found therein that is to animated, and wherein the process action of displaying the sections of each character as dictated in the instructions associated with that character for each time period, comprises displaying the sections of the character under consideration as dictated in the instructions associated with the behavior category designated for the character by the script file for the current time period, based on the position and orientation of the dividing line, or the location of the rotation point assigned to a character section, or both, given the font type designated for the character by the split file.

14. The process of claim 12, wherein said script file further provides instructions for either playing audio sound effects during one or more of the prescribed-length time periods, or displaying the alpha-numeric characters associated with at least a portion of the message or document with a prescribed color and/or texture during one or more of the prescribed-length time periods, or both.

15. The process of claim 10, wherein the process actions of receiving parametric information pertaining to alpha-numeric characters found in the message or document and receiving animation instructions pertaining to the display of alpha-numeric characters found in the message or document, comprises receiving said information and instructions for each alpha-numeric character found in said message or document that is to be animated contemporaneously with the receipt of the message or document.

16. A computer-implemented process for sending a message or document which when viewed by a recipient displays animated alpha-numeric characters on a display screen, comprising using a computer to perform the following process actions for each of at least one character:
  sending parametric information pertaining to alpha-numeric characters found in the message or document to the recipient along with the message or document characters, said information comprising, for each character to be animated,
    a position and orientation of at least one straight, geometric dividing line each of which transects the character transversely so as to segment the character into sections, wherein said dividing line position is defined by a distance between a first prescribed point on the dividing line and a prescribed horizontal line associated with the character and said dividing line orientation is defined by an angle of rotation about a second prescribed point, said first prescribed point and second prescribed point being at the same location or different locations, and
    a location of a rotation point assigned to each of at least one of the character sections;
  sending animation instructions pertaining to the display of alpha-numeric characters found in the message or document on said display screen to said recipient along with the parametric information, said animation instructions comprising for each section of each character being animated, instructions for displaying the section for each of a series of prescribed-length time periods, said instructions defining if the section is to be displayed, in comparison with its appearance in the immediately preceding time period, with a translation with respect to an adjacent section, or a rotation about a rotation point of the section, or both, or no change as long as there was or will be some change in at least one of the sections during one of the time periods.

17. The process of claim 16, wherein the process actions of sending parametric information pertaining to alpha-numeric characters found in the message or document to the recipient along with the message or document characters and sending animation instructions, comprises the actions of:
  prior to sending said information and instructions, establishing a font type or types the alpha-numeric characters are to exhibit and a behavior category or categories the animation of the alpha-numeric characters are to exhibit for each of one or more potential recipients of messages or documents, wherein said font type dictates what parametric information pertaining to alpha-numeric characters is to be sent to a particular recipient, and wherein said behavior category dictates the animation instructions that are to be sent to a particular recipient, and wherein the established font type or types and behavior category or categories are designed to result in animations of the characters in a message or document being displayed which convey the emotions of a message sender to the particular recipient;
  identifying the recipient of a message or document being sent;
  designating the font type or types and the behavior category or categories established for the identified recipient; and
  sending the parametric information pertaining to alpha-numeric characters found in the message or document and the animation instructions, dictated by the designated font type or types and the behavior category or categories, to the identified recipient along with the message or document characters.

18. The process of claim 16, wherein the process actions of sending parametric information pertaining to alpha-numeric characters found in the message or document to the recipient along with the message or document characters and sending animation instructions, comprises the actions of:
  prior to sending said information and instructions, establishing a font type or types the alpha-numeric characters are to exhibit and a behavior category or categories the animation of the alpha-numeric characters are to exhibit for each of one or more triggering characters found in a message or document, wherein said font type dictates what parametric information pertaining to alpha-numeric characters is to be sent along with the message or document characters, and wherein said behavior category dictates the animation instructions that are to be sent along with the message or document characters, and wherein the established font type or types and behavior category or categories are designed to result in animations of the characters in a message or document being displayed which convey the emotions of a message sender to the particular recipient;
  identifying triggering characters in a message or document being sent and a portion of the message or document that each of the triggering characters applies to;
  designating the font type or types and the behavior category or categories established for the identified triggering characters; and
  sending the parametric information pertaining to alpha-numeric characters found in the message or document and the animation instructions, dictated by the designated font type or types and the behavior category or categories, along with the message or document characters for each portion of the message or document that each of the triggering characters applies to.

19. The process of claim 18, wherein said triggering characters are emoticons.

20. The process of claim 18, wherein said triggering characters are at least one of (i) a word, (ii) a phrase, and (iii) a punctuation mark.

* * * * *